(12) United States Patent
Strunk et al.

(10) Patent No.: US 11,650,048 B2
(45) Date of Patent: May 16, 2023

(54) APPARATUS AND METHOD FOR COAXTAILLY ALIGNING TWO ROTATABLE SHAFTS

(71) Applicant: REDALIGN LLC, Birmingham, MI (US)

(72) Inventors: Fred L. Strunk, Hudson, FL (US); Thomas Edward Woycik, Birmingham, MI (US); Marshall Bruce Cummings, Beverly Hills, MI (US)

(73) Assignee: REDALIGN LLC, Birmingham, MI (US)

( * ) Notice: Subject to any disclaimer, the term of this patent is extended or adjusted under 35 U.S.C. 154(b) by 79 days.

(21) Appl. No.: 17/522,303

(22) Filed: Nov. 9, 2021

(65) Prior Publication Data

US 2022/0065622 A1    Mar. 3, 2022

Related U.S. Application Data

(63) Continuation-in-part of application No. 16/915,728, filed on Jun. 29, 2020, now Pat. No. 11,193,760.

(Continued)

(51) Int. Cl.
| | |
|---|---|
| *G01B 11/27* | (2006.01) |
| *B25J 13/08* | (2006.01) |
| *G01S 17/88* | (2006.01) |

(52) U.S. Cl.
CPC ........... *G01B 11/272* (2013.01); *B25J 13/088* (2013.01); *G01S 17/88* (2013.01)

(58) Field of Classification Search
CPC ................................ B25J 13/088; G01S 17/88
(Continued)

(56) References Cited

U.S. PATENT DOCUMENTS

| | | |
|---|---|---|
| 4,518,855 A | 5/1985 | Malak |
| 6,040,903 A | 3/2000 | Lysen |

(Continued)

OTHER PUBLICATIONS

International Search Report and Written Opinion, PCT/US2021/012177, Prepared by the United States Patent and Trademark Office, dated Apr. 8, 2021.

(Continued)

*Primary Examiner* — Tarifur R Chowdhury
*Assistant Examiner* — Omar H Nixon
(74) *Attorney, Agent, or Firm* — Brooks Kushman P.C.; John Nemazi

(57) ABSTRACT

An apparatus and method for aligning two coaxially coupled rotatable shafts. A servo operated multi axis positioning device is movable along a longitudinal axis parallel to the axis of the shafts, and movable vertically to position a laser range (LRF) adjacent to the two shafts, which measures the distance between the LRF and a spot on the shafts. A controller having a processor and memory communicates with the positioning device and the LRF to collect data at two axial positions on each shaft. At each position the LRF measures the distance to the shaft and stores the measurement and location data. The LRF is vertically repositioned and the measurement and storing steps are repeated over a scan distance sufficient to provide enough data to determine the location of the shaft center. The processor then calculates and compares the shafts centerlines and determines the necessary adjustments needed to move the shafts into coaxial alignment.

21 Claims, 8 Drawing Sheets

Related U.S. Application Data

(60) Provisional application No. 62/869,768, filed on Jul. 2, 2019.

(58) Field of Classification Search
USPC .......................................................... 356/400
See application file for complete search history.

(56) References Cited

U.S. PATENT DOCUMENTS

| | | |
|---|---|---|
| 6,915,582 B1 | 7/2005 | Engels |
| 7,609,364 B2 | 10/2009 | Zhao |
| 8,533,965 B2 | 9/2013 | Stroemberg |
| 9,410,787 B2 | 8/2016 | Raab et al. |
| 2005/0243315 A1 | 11/2005 | Foley |
| 2007/0271800 A1 | 11/2007 | Hersey et al. |
| 2011/0161034 A1 | 6/2011 | Barth |
| 2011/0194103 A1 | 8/2011 | Stroemberg |
| 2013/0111768 A1* | 5/2013 | Lenz .................... G01C 15/004 33/228 |
| 2015/0300802 A1 | 10/2015 | Linde |
| 2016/0223320 A1 | 8/2016 | Hoelzl |
| 2018/0181096 A1 | 6/2018 | Harris |
| 2018/0299263 A1 | 10/2018 | Jywe et al. |

OTHER PUBLICATIONS

Manual SKF Shaft Alignment Tool TKSA 31 & TKSA 41, SKF Group, Aug. 2017.

* cited by examiner

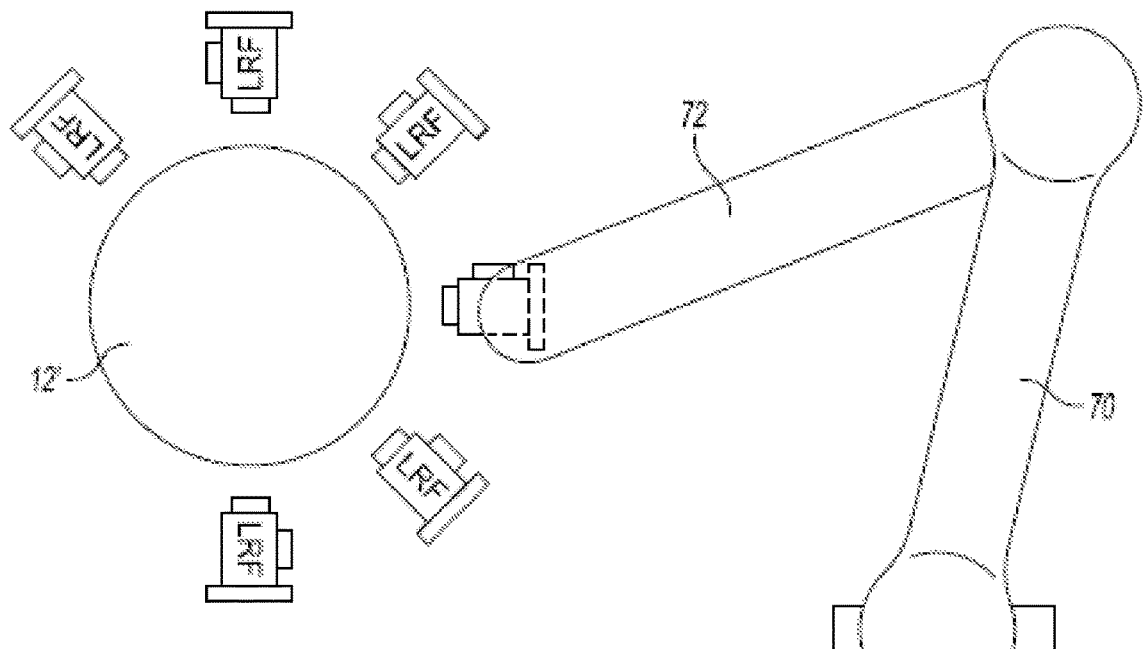
Fig-13
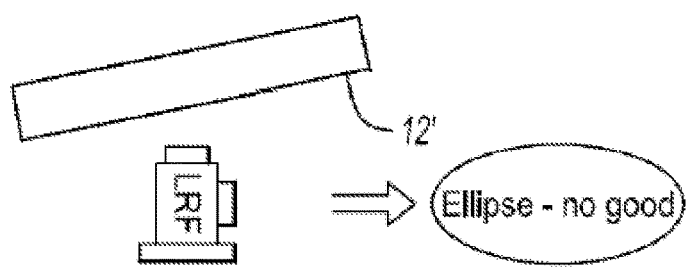
Fig-14A
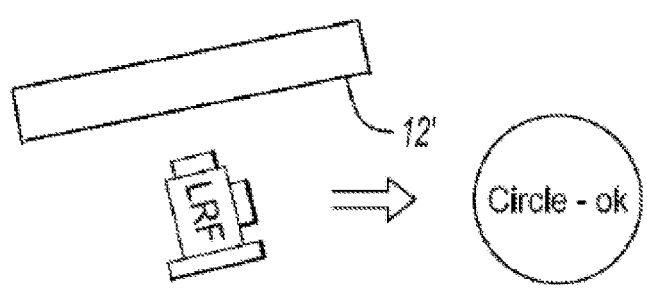
Fig-14B
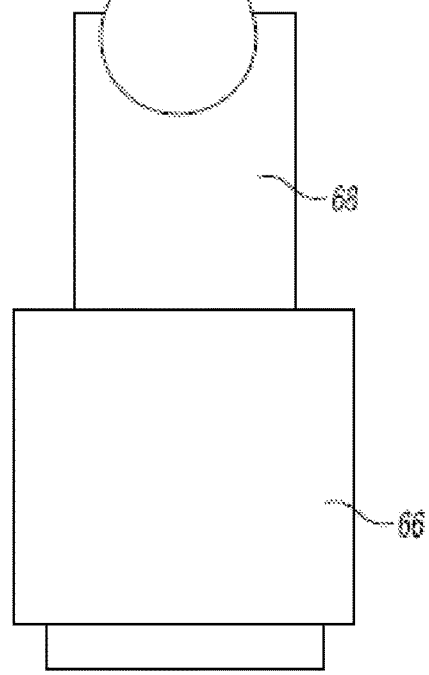

US 11,650,048 B2

APPARATUS AND METHOD FOR COAXTAILLY ALIGNING TWO ROTATABLE SHAFTS

CROSS-REFERENCE TO RELATED APPLICATION

This application is a continuation-in-part of U.S. application Ser. No. 16/915,728 filed Jun. 29, 2020, which claims the benefit of U.S. provisional application Ser. No. 62/869,768 filed Jul. 2, 2019, the disclosures of which is hereby incorporated in its entirety by reference herein.

TECHNICAL FIELD

This application relates to an apparatus and a method for coaxially aligning two rotatable shafts, particularly shafts of a rotary machine, such as a pump and a motor, connected by a rotary coupling.

BACKGROUND

When two rotatable shafts are coaxially coupled together it is very important to minimize coaxial misalignment. Even a small amount of misalignment can result in power losses, unnecessary bearing loads and premature coupling failure. Accordingly, the shafts must be carefully initially aligned and periodically inspected and adjusted as necessary.

Motor driven pumps used in municipal water systems and in sewage collection and treatment facilities are typical users of large motor and pump pairs which must be maintained in proper coaxial alignment. Further, many industrial and chemical facilities use very large motor and pump pairs, turbines and generators, motors and compressors, and other co-axially aligned rotatable machines which need to be maintained in proper coaxial alignment.

Various devices have been used to align two coaxial rotatable shafts in the past ranging from traditional mechanical surface plate gauges to a laser and a detector mounted to adjacent shafts to be inspected while the shafts are manually rotated as illustrated in U.S. Pat. No. 8,533,965.

SUMMARY

An apparatus and method for aligning two coaxially coupled rotatable shafts is provided. Alignment can be, and is preferably, measured while the shafts are rotating in their normal operating condition. A base is positioned adjacent to the shafts to be aligned. The base supports a servo operated positioning device which is movable along a longitudinal axis parallel to the axis of the shafts, and movable to vertically position spots on the shaft measured by a laser range finder (LRF) adjacent to the two rotatable shafts. The LRF measures the distance between the LRF and a spot on the shaft. A controller having a processor and memory communicates with the positioning device to cause the LRF to scan a plurality of spots on the shafts spaced over a vertical range and collects data at two or more axial positions on each shaft. At each position the LRF measures the distance to the shaft and stores the measurement and location data. The spot measured by the LRF is vertically repositioned and the measurement and storing steps are repeated over a scan distance sufficient to provide enough data to determine the location of the shaft center. The processor then calculates and compares the shaft centerlines and determines the necessary adjustments needed to move the shafts into alignment.

An exemplary embodiment of the apparatus for aligning two rotatable shafts has a base which is positionable adjacent to two rotatable shafts while they are coaxially coupled together and rotating. A servo operated positioning device is attached to the base, movable along a longitudinal X-axis parallel to the axis of the rotating shafts, and movable vertically along a Y-axis. A laser range finder (LRF) is affixed to the positioning device and spaced a distance from the two rotating shafts, to measure the distance between the LRF and a spot on the rotating shafts parallel to a Z-axis. A controller is provided which communicates with the positioning device and the LRF. The controller has a processor programmed to position the LRF at a first axial location on a first one of the rotating shafts, measuring distance to the shaft and stores the measurement and spot location data. The controller vertically repositions the LRF and repeats the measurement and data storage steps. Vertical repositioning and measurement steps are repeated until enough data is collected to determine the location of the shaft center at the first axial location. The processor is programmed to reposition the LRF at a second X-axis location on a first one of the rotating shafts and the Y-axis scan is repeated and the location of the first shaft axis is calculated. The processor is programmed to reposition the LRF at a third and fourth X-axis location on a second one of the rotating shafts and the Y-axis scan is repeated and the location of the second shaft axis is calculated. The alignment of the two shafts axes are compared. The processor then determines the adjustment of one of the two shafts that is necessary to move the shafts in to coaxial alignment.

Another exemplary embodiment of the apparatus for aligning two rotatable shafts has a base which is positionable adjacent to two rotatable shafts while they are coaxially coupled together and rotating. A servo operated positioning device, in the form of a multi axis robotic arm, is attached to the base, movable along a longitudinal X-axis parallel to the axis of the rotating shafts. The robotic arm has an end which is movable along at least the Z and Y axes using servo motors or other means of electronic positioning. Preferably, the robotic arm also operates along the X axis as well. A laser range finder (LRF) is pivotably affixed to the end of the robotic arm to measure the distance between the LRF and a spot on the rotating shaft. A controller is provided which communicates with the robotic arm and the LRF. The controller has a processor programmed to position the LRF at a first axial location on the first one of the rotating shafts. The robotic arm positions the LRF adjacent to the rotating shaft to measuring distance between the shaft and the LRF. The LRF measurement and the LRF location on the robotic arm end is used to determine and store location data of a spot on the shaft peripheral surface. The controller repositions the robotic arm and the LRF to measure a different spot on the peripheral surface and repeats the measurement and data storage steps. The repositioning and measurement steps are repeated until enough data is collected to determine the location of the shaft center at the first axial location.

The processor is programmed to reposition the LRF at a second X-axis location on a first one of the rotating shafts and the scan is repeated and the location of the first shaft axis is calculated. The processor is programmed to reposition the LRF at a third and fourth X-axis location on a second one of the rotating shafts and the scan is repeated and the location of the second shaft axis is calculated. The alignment of the two shafts axes are compared. The processor then determines the adjustment of one of the two shafts that is necessary to move the shafts in to coaxial alignment.

A method for aligning two rotating shafts which are coaxially coupled together is disclosed which includes providing a positioning device attached to a base to be placed adjacent to the shafts to be aligned. The positioning device has a holder movable along a longitudinal axis parallel to an axis of two axially coupled rotating shafts, and movable vertically to position a laser range finder (LRF) affixed to the positioning device and spaced a distance from the two rotating shafts. The LRF measures the distance between the LRF and a plurality of vertically spaced spots on the rotating shafts. A controller, having a processor and memory, is provided which communicates with the LRF and a user interface. The LRF is positioned at a first axial location on a first one of the rotating shafts, the controller communicating with the LRF to measure distance to a spot on the shaft and stores the measurement and spot location data. Data is collected at a minimum of three spot locations or until enough data is collected to determine the location of the shaft center at the first axial location. This process is repeated at a second X-axis location on the first shaft and at a third and fourth X-axis location of the second shaft. The processor then calculates the centerline of the two shafts using stored measurement and spot location data using a best-fit circle algorithm to define the axis of the two shafts and then determines the adjustment of one of the two shafts needed to move the shafts in to proper alignment.

In the robotic arm embodiment, the LRF is moved in both the Z and Y directions. Preferably the LRF axis is oriented perpendicular to the shaft axis prior to making measurements.

In an alternative embodiment the diameter of the shaft is known or is measured and input into the processor. With the shaft diameter known it is only necessary to collect data at a minimum of two Y-axis locations.

In yet another embodiment rather than vertically moving the LRF, the LRF is located at the approximate shaft center height. The beam of LRF then pivots about an axis generally parallel to the shaft to scan a plurality of measurements at one or more Y-axis locations. The pivoting LRF can also be used in a system of unknown shaft diameters if data is collected at three Y-axis locations.

BRIEF DESCRIPTION OF THE DRAWINGS

FIG. 13 is a side view of the multi axis robotic arm;

FIGS. 14A and 14B are views showing the effect of LRF misalignment with the shaft;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosed preferred embodiment of the apparatus 10 and the method are used to calculate the adjustments necessary to realign two coupled, rotatable shafts which are inspected while "hot and rotating" in a steady state operating condition. The two shafts are typically associated with a large co-axially aligned rotating machines such as motor and pump pairs, turbines and generators, and motors and compressors, and other co-axially aligned rotating machines. which need to be maintained in proper alignment. While a motor M and pump P are described in this preferred embodiment the claims are not limited to any specific types or size of co-axially aligned rotating machines. Similarly, the disclosed example is oriented horizontally however the apparatus and method could also be used in machines of other orientations such as a vertical turbine and generator. The apparatus and method can be used on the two shafts when not rotating but it has been found that more practical results can be achieved while the shafts are rotating.

Figure 1:
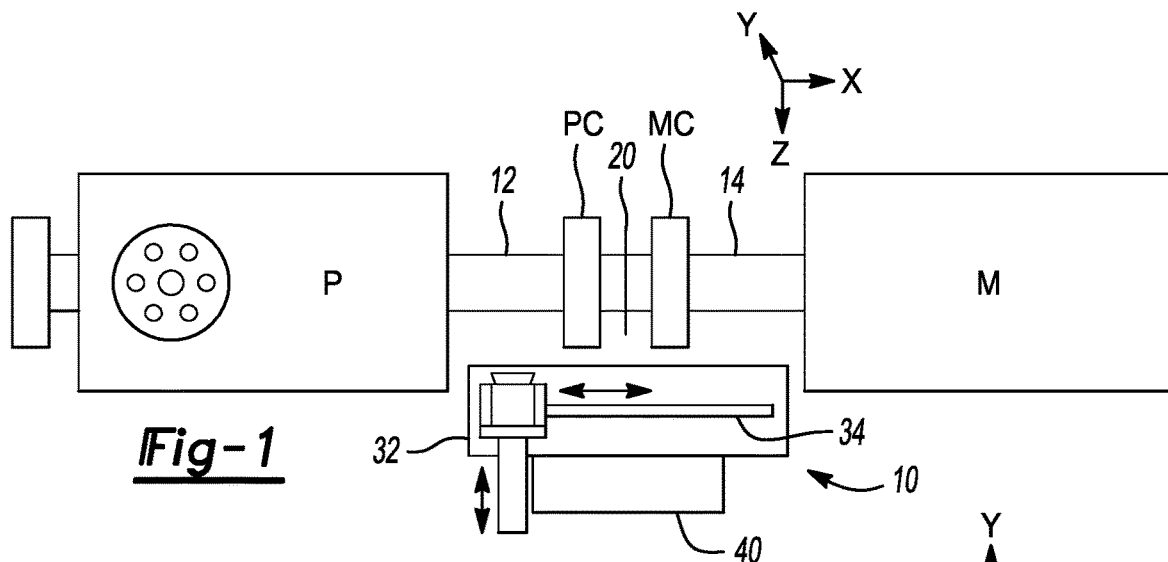
FIG. 1 is a top view of an alignment apparatus adjacent a motor driven pump.

In the sample embodiment shown in FIG. 1 motor M drives the pump P. The pump shaft 12 is typically part of a pump assembly P, that is coupled to inlet and outlet pipes and for all intents and purposes is immovable and will remain "stationary". The motor shaft 14 is part of a motor assembly M and is coupled to the pump shaft 12 by a pair of couplings 16, 18 and one or more flexplates 20. Slight adjustments to the position of the motor M can be made by loosening the bolts 22 holding the motor feet 24 to the foundation 26 and shifting the motor by shimming the motor feet. Great care is taken to align the two shafts in all dimensions before turning on the motor. Shims 28 are placed under four feet 24 of the motor M to adjust the height (Y-axis), and adjustment screws 30 (shown in FIG. 3) are used to move the motor in-and-out laterally (Z-axis).

The apparatus 10 computes the amount of adjustment necessary to reposition the motor feet along the Y-axis and Z-axis to realign the two shafts by measuring shaft location while the motor and pump is "hot and rotating".

Figure 2:
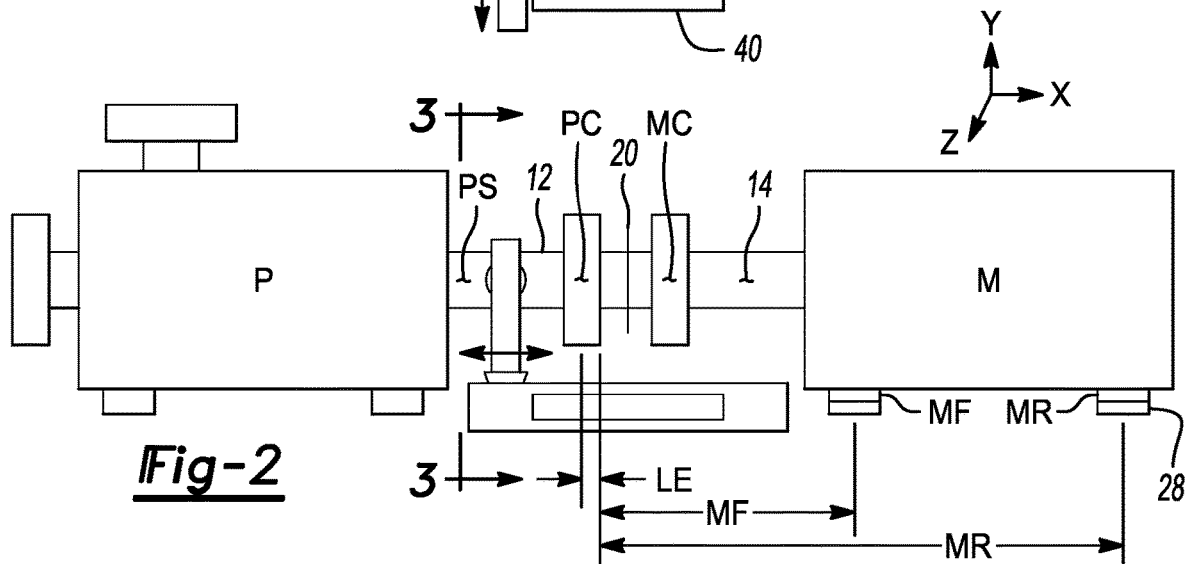
FIG. 2 is a side view of the alignment apparatus of FIG. 1.

FIG. 1 illustrates a top plan view of a large electric motor M connected to a pump P. A side view is shown in FIG. 2 illustrating the positioning apparatus 10 relative to the motor and pump and the various measurement locations. Apparatus 10 conducts a measurement scan of at least four axially spaced locations, two on the pump shaft and two on the motor shaft. The measurements are made using a non-contact laser range finder (LRF) 30. The LRF is attached to a positionable base 32 adjacent to the motor M and pump P as shown. The LRF is movable relative to the motor axis by a multi axis positioning device. An X-servo 34 connected to a base 32 moves the LRF parallel to the motor axis. The LRF is movable vertically in the Y direction along a vertical column 36 by a Y-servo 38 connected to the X-servo 36.

Figure 3:
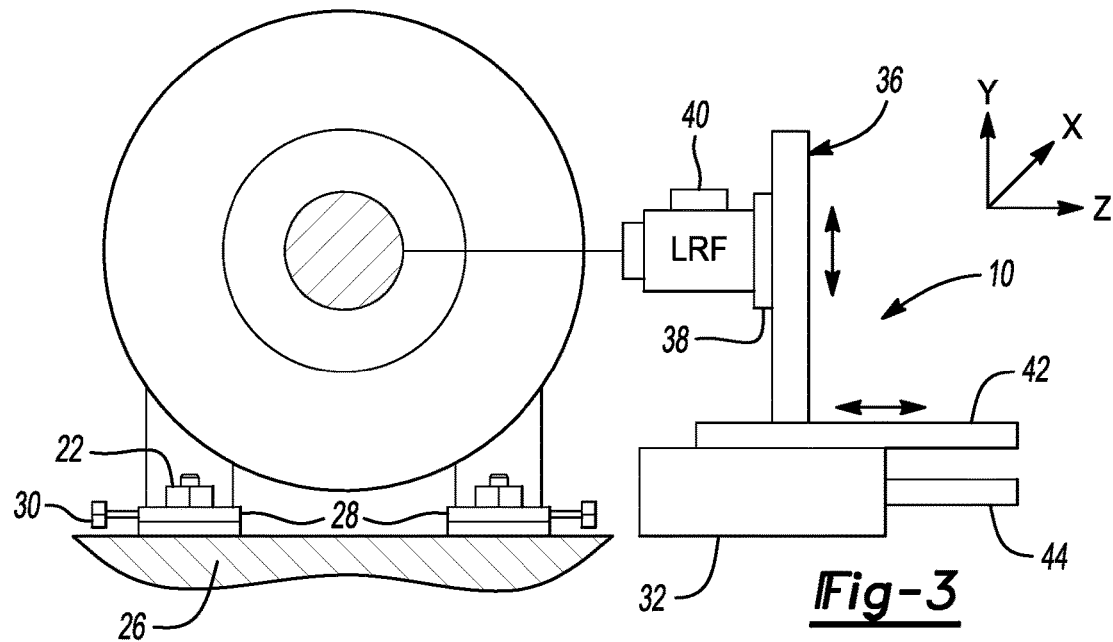
FIG. 3 is a sectional view taken along line 3-3 of FIG. 2.

As illustrated in FIG. 3 the LRF measures the distance between the LRF and the pump shaft 12 at point PS. Optionally the LRF is provided with level sensor with a micro level adjustment servo 40 to maintain the LRF and the produced laser output beam exactly horizontal. Another optional feature is a Z-axis servo 42 enabling the LRF to be positioned close to the rotating surface, maintaining the scan distance to less than 2 inches, preferably less than 1 inch. By minimizing the Z distance measurement accuracy can be significantly improved by selecting a LRF having a short range.

The following input parameters are input into the controller 44 via a user interface before running the alignment scan. Note that X-axis refers to left-and-right in above FIGS. 2 & 3, Y-axis to up-and-down in FIG. 2, and Z-axis to in-and-out best seen in FIG. 1.

PSx: X-position on pump shaft (or similar), closest to pump
PCx: X-position on pump side of coupling (or similar)
MCx: X-position on motor side of coupling
MSx: X-Position on motor shaft (or similar), closest to motor
MF: distance from inside edge of pump coupling to front feet on motor
MR: distance from inside edge of pump coupling to rear feet on motor
LE: distance from laser reading point PCx to inside edge of pump coupling As previously stated, the pump P should be considered stationary. Therefore, the imaginary centerline of the pump shaft is the foundation used for all calculations. The motor M must be moved through shims 28 and adjustment screws 30 to align or realign with the pump.

Figure 4:
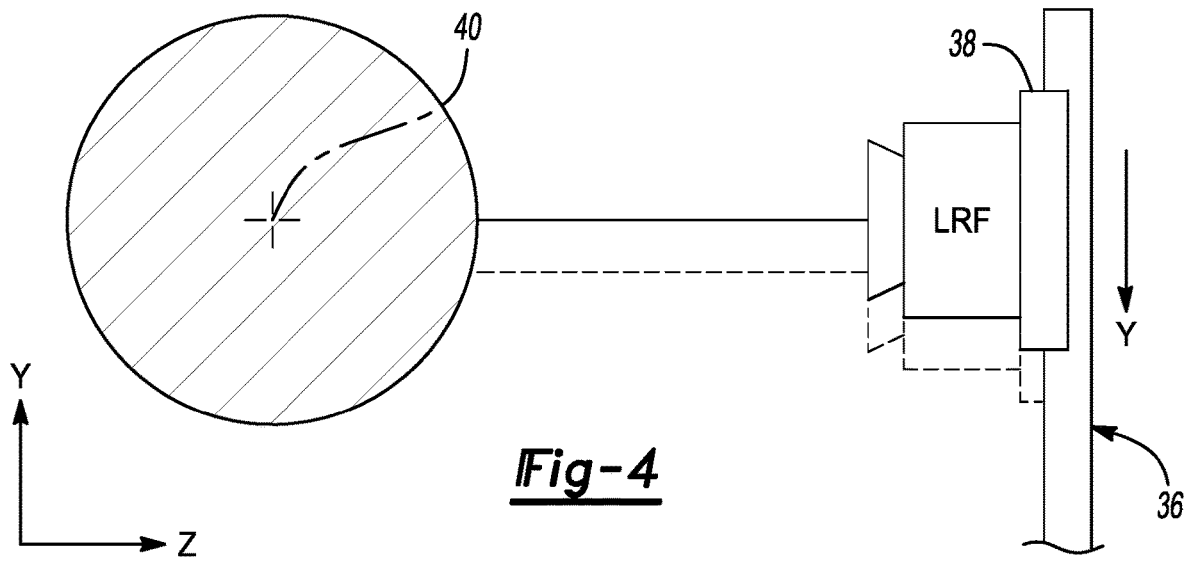
FIG. 4 is an enlarged section of FIG. 3 showing the laser range finder (LRF) scanning motion.
Figure 5:
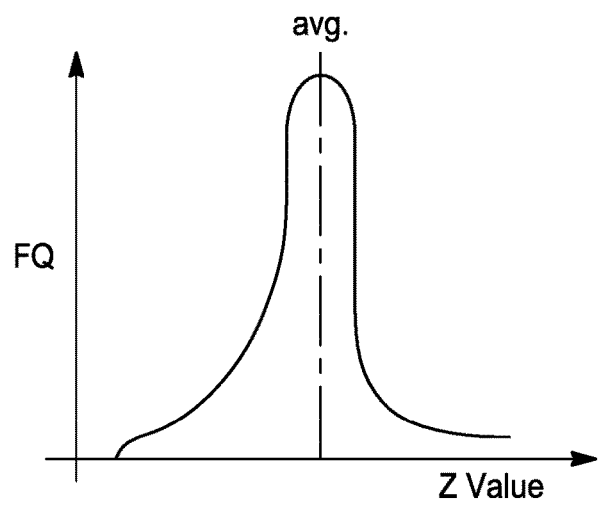
FIG. 5 is a histogram of the data collected at one scan point.

First, the X-values for PS, PC, MC, and MS are entered into the system, typically by moving the LRF (through the User Interface UI) to the preferred positions and storing these X-values. Once the scan is initiated, the laser scans the surface (up and/or down) at PSx and PCx as shown in FIG. 4, collecting thousands of data points on the surface of the shaft or coupling. At each data point hundreds of readings are made, preferably at least 200, and an average or mean of the readings are stored. Optionally, the lowest and highest readings are discarded to improve accuracy however a number of other techniques can be used to improve accuracy of the stored data point. The Y-servo 38 moves the LRF to the next reading site and another average or mean data point is stored. Preferably the X movement increment is over 3 inches, and more preferably over 4 inches.

The Y-servo in the illustrated embodiment has a travel of 1.0 inches which is sufficient for many commonly used shaft sizes. Ideally the Y-servo scan distance is at least 20%, preferably over 20% and less than 50% of the radius of the rotating section being scanned. When used on large diameter shafts and couplings the scan distance increases accordingly. The scan is done while the motor is on and the shafts are rotating and have reached a steady state operating condition.

Figure 6:
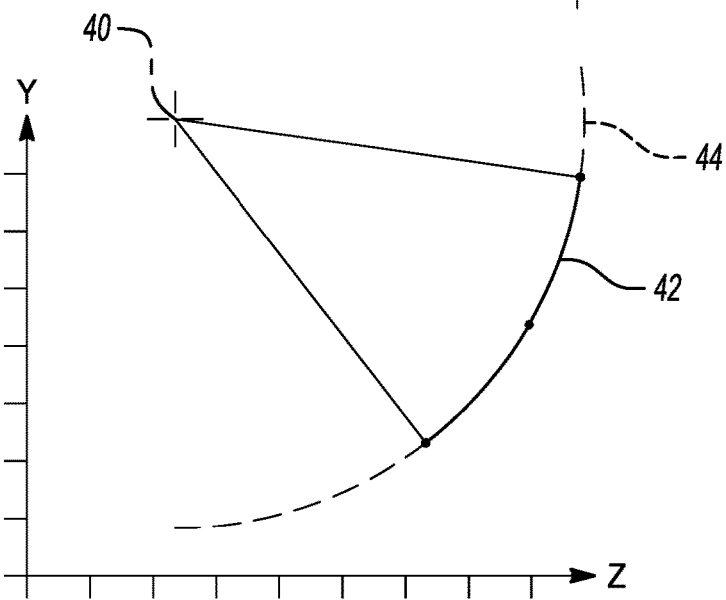
FIG. 6 is X-Y plot of the average scan data at one shaft position to which a circle is fit in order to locate the shaft center.

The collected averaged scanned measurements at each point PS, PC, MC, and MS are evaluated programmatically in a Z-Y diagram as shown in FIG. 6. This series of data points form a curved circular segment 42 to which a circle is fit to using a best-fit algorithm. Preferably, 50 to 250 data points make up the circular segment. However, it is possible to fit a circle to as few as three data points as illustrated in bold in FIG. 6.

Using a best-fit-circle algorithm, such as Levenberg-Marquardt, the center point 40 of the shaft can be calculated in three dimensions, at both PSx and PCx. The best-fit circle 44 has a center point 40 which defines a point on a line representing the axis of the shaft, as illustrated in FIG. 6. These points provide two absolute points in three-space (PSx, PSy, PSz) and (PCx, PCy, PCz). Two 3D points defines a 3D line, and this line determines the pump shaft centerline. More than two points could be used as well, meaning additional intermediate points between PS and PC. In this case, a best-fit-line algorithm, such as least squares, may be used to determine a more precise centerline, however two points is satisfactory.

Important outputs from the algorithms include the pump pitch (Y-axis slope) and the pump yaw (Z-axis slope) relative to apparatus 10, computed from $(PCy-PSy)/(PCx-PSx)$. Pump yaw is computed from $(PCz-PSz)/(PCx-PSx)$. Note there is no need for the pump or apparatus to be perfectly level since all measurements are relative. We now have two 3D points, that define an imaginary centerline in three dimensions that extends from the pump through the motor. Next, we can align the shaft 14 of the motor M to match the pump shaft 12 in all three dimensions.

Scanning the motor shaft 14 is done similar to the scanning of the pump shaft 12. The LRF scans the motor shaft 14 or the motor coupling 18, or at two or more spaced apart X-axis points (i.e. MCx, MSx, etc.) and computes at least two center points MCx, MCy, MCz and MSx, MSy, MSz and the resultant motor centerline which is best fit using a best-fit-line algorithm. Like with the pump, the motor's relative pitch $(MSy-MCy)/(MSx-MCx)$ and yaw $(MSz-MCz)/(MSx-MCx)$ are computed for the motor's centerline. Even after precise "cold" alignment, the motor centerline is typically out of alignment with the pump centerline once "hot and running". To be in near-perfect alignment, the motor must be shut down and the feet adjusted (up/down and in/out) so that its centerline is aligned with the centerline of the "stationary" pump.

We have computed the two 3D points that define the pump shaft centerline. We have also computed the pump pitch and yaw relative to the apparatus. To align the two shafts, we need to make the motor pitch and yaw the same as the pump pitch and yaw, and that the two shaft axes intersect at the coupling connecting the shafts together. A translation (up/down, in/out) may also be required of the motor shaft in addition to adjusting the pitch and yaw to obtain proper co-axial alignment. For both MC and MS, we can compute the ideal 3D coordinates that would put the motor shaft in perfect alignment with the pump shaft. We will call these ideal coordinates MCx, MCyi, MCzi and MSx, MSyi, MSzi.

It should be noted that the 3D alignment problem can be broken down into two, 2D alignments, namely up/down and in/out (the motor is not adjusted left/right once coupled to the pump). First, we will discuss the adjustment calculations in the Y-axis (i.e. pitch alignment) and separately the adjustment calculation for the Z-axis (i.e. yaw alignment). We are solving for how much to adjust the feet of the motor such that the two center points at MCx, MCyi, MCzi and MSx, MSyi, MSzi fall perfectly on the imaginary extended centerline projected out from the pump.

Pitch Calculation: A 2D line can be described by the equation y=mx+b, where m is the pitch and b is the y-intercept. For pump pitch, we have two baseline points PSx, PSy and PCx, PCy which can be used to compute the perfect pitch m=(y2−y1)/(x2−x1) and the y-intercept (b=y−mx). With m and b known, we can compute the ideal (i.e. aligned) y-value (yi) for any x-value, specifically at MCx and MSx. This provides us with MCx, MCyi and MSx, MSyi.

Yaw Calculation: Similarly, we can represent the pump's 2D yaw line with the equation z=nx+c, where n is the yaw and c is the z-intercept. For pump yaw, we have two baseline points PSx, PSz and PCx, PSz which can be used to compute the perfect yaw n=(z2−z1)/(x2−x1) and the z-intercept (c=z−nx). With n and c known, we can compute the ideal (i.e. aligned) z-value (zi) for any x-value, specifically at MCx and MSx. This provides us with MCx, MCzi and MSx, MSzi.

By combining the results from the ideal pitch and yaw calculations, we now have 3D coordinates MCx, MCyi, MCzi and MSx, MSyi, MSzi, and any additional points in between. These are where the motor center points need to be in order for the two shafts to be in perfect alignment, and typically vary from MCx, MCy, MCz and MSx, MSy, MSz which is where they were measured to be.

Calculating the difference between the existing, measured motor center points MCx, MCy, MCz and MSx, MSy, MSz and their ideal, aligned locations MCx, MCyi, MCzi and MSx, MSyi, MSzi is simple subtraction. The only complication is that the motor feet adjustments are not directly below MC and MS. Instead, the adjustments are some distance away which creates a "lever arm" at MF and MR.

However, we can use a simple ratio to determine the amount of adjustment at some point further away. We know the distance from PS-to-MC is (PSx−MCx). We also know the distance from PS-to-MF is ((PCx−PSx)+LE+MF). If the second distance is twice the first, for example, then we must double the amount of adjustment at the front foot. Similarly, we know the distance from PS-to-MR is ((PCx−PSx)+LE+MR). If the distance to MR is three times the distance to MC, for example, then we must triple the amount of adjustment at the rear foot. This is true for both pitch adjustments (i.e. shims) and yaw adjustments (screws 30).

The apparatus uses precise positioning of the laser along the X-axis, surface scanning in the Y-axis using a LRF making high-precision laser distance measurements in the Z-axis and precise incremental repositioning of the laser along the Y-axis to establish a baseline position for the pump and motor shaft surfaces. Outliers are filtered from the raw data and the best available measurement data is run through a best-fit-circle algorithm to determine two or more center points for each shaft. Adjustments to the motor feet are then calculated, and the motor can be put into near perfect alignment with the pump. No other alignment system can measure alignment of a motor and pump shaft while "hot and running" or align two shafts to this level of precision.

Figure 8:
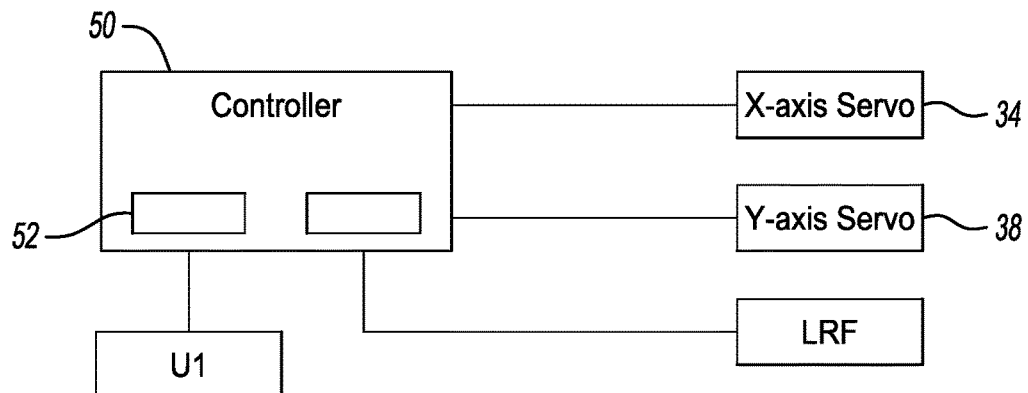
FIG. 8 is a schematic of the components making up the alignment apparatus.

The basic components of the measurement apparatus 10 are illustrated schematically in FIG. 8. The apparatus 10 has a controller 50 having a processor 52 and a memory 54 for controlling the movement of the LRF, possessing the collected data, calculating the position of the pump and motor shafts and calculating the necessary movement to co-axially align the shafts. The controller is coupled to the X-servo 34, the Y-servo 38 and to a user interface UI. The UI, which can be a keyboard and monitor of a touch screen, enables the user to cause the controller to position the LRF at the four data collection positions PS, PC, MC, and MS before the start of the measurement procedure. Alternatively, the UI can be a laptop computer, a smart phone or tablet. Preferably the X-servo moves the LRF between the four PS, PC, MC, and MS. However, in a low-cost embodiment the LRF could be manually moved along the base on a precision track and positioned at stops precisely located at the four spaced apart measurement locations. In even a lower cost point apparatus the Y-servo could be replaced with a mechanical screw and guide way similar to that use in a lathe or other machine tools to manually position the LRF at three or more precisely spaced apart locations enabling a best-fit curve to be fit to the three points in order to define the shaft center.

Figure 7:
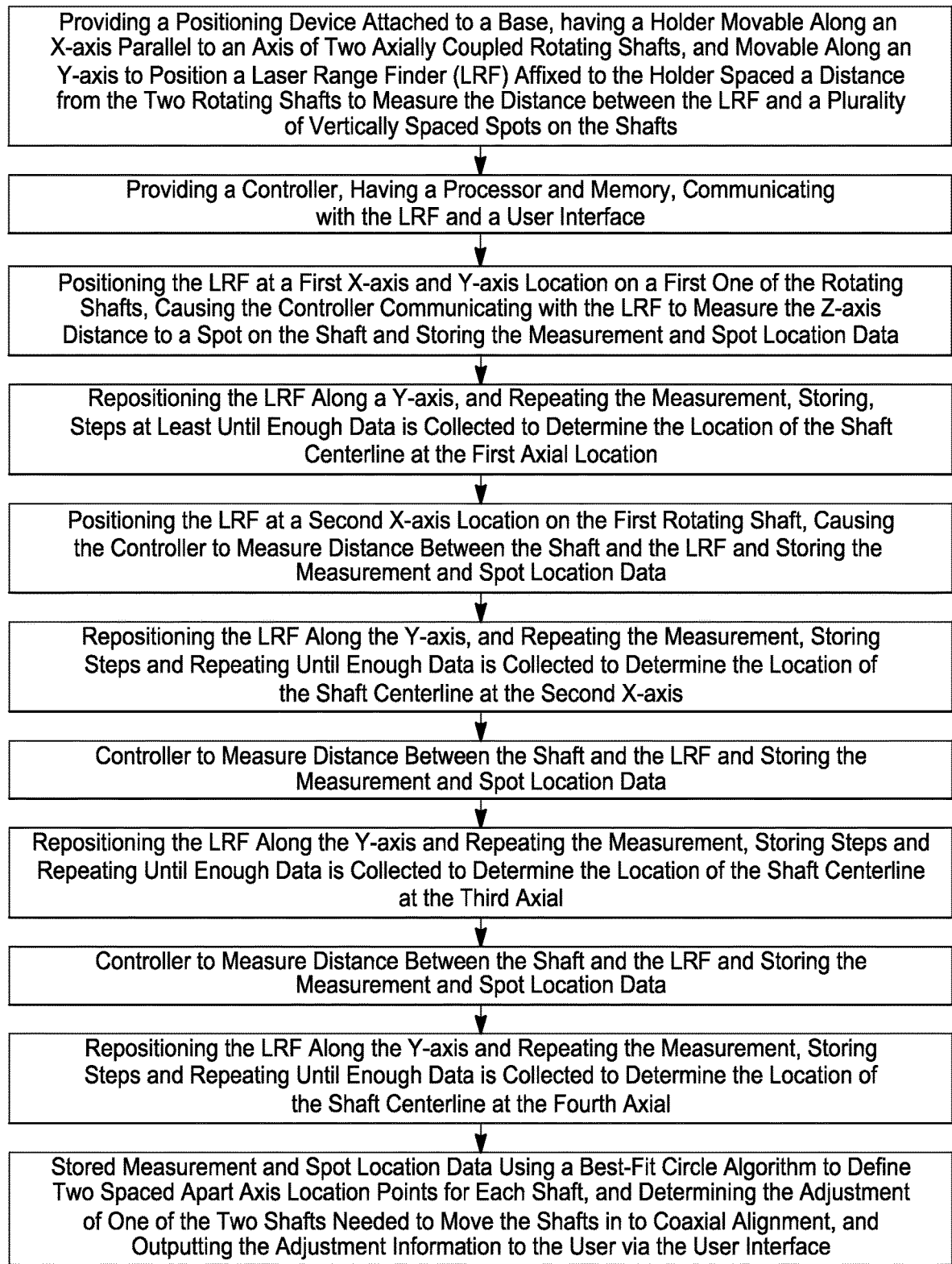
FIG. 7 is a block diagram of the use of the alignment apparatus to perform the shaft alignment method.

The method for aligning two rotating shafts which are coaxial coupled together is shown in block diagram in FIG. 7. The method comprises the steps of:

providing a positioning device attached to a base, having a holder movable along an X-axis parallel to an axis of two axially coupled rotating shafts, and movable along a Y-axis to position a laser range finder (LRF) affixed to the holder a paced a distance from the two rotating shafts to measures the distance between the LRF and a plurality of vertically spaced spots on the shafts| providing a controller, having a processor and memory, communicating with the LRF and a user interface| positioning the LRF at a first X-axis and Y-axis location on a first one of the rotating shafts, causing the controller communicating with the LRF to measure the Z-axis distance to a spot on the shaft and storing the measurement and spot location data;

repositioning the LRF along a Y-axis, and repeating the measurement, storing, steps at least until enough data is collected to determine the location of the shaft centerline at the first axial location;

positioning the LRF at a second X-axis location on the first rotating shaft, causing the controller to measure distance between the shaft and the LRF and storing the measurement and spot location data repositioning the LRF along the Y-axis and repeating the measurement, storing steps and repeating until enough data is collected to determine the location of the shaft centerline at the second X-axis location positioning the LRF at a third X-axis location on a second one of the rotating shafts, causing the controller to measure distance between the shaft and the LRF and storing the measurement and spot location data repositioning the LRF along the Y-axis and repeating the measurement, storing steps and repeating until enough data is collected to determine the location of the shaft centerline at the third axial location positioning the LRF at a fourth axial location on the second rotating shaft, measuring causing the controller to measure distance between the shaft and the LRF and storing the measurement and spot location data repositioning the LRF along the Y-axis and repeating the measurement, storing steps and repeating until enough data is collected to determine the location of the shaft centerline at the fourth axial location; and calculating in the processor the centerline of the two shafts at each of the four X-axis locations using stored measurement and spot location data using a best-fit circle algorithm to define two spaced apart axis location points for each shaft and determining the adjustment of one of the two shafts needed to move the shafts in to coaxial alignment and outputting the adjustment information to the user via the user interface.

Figure 9:
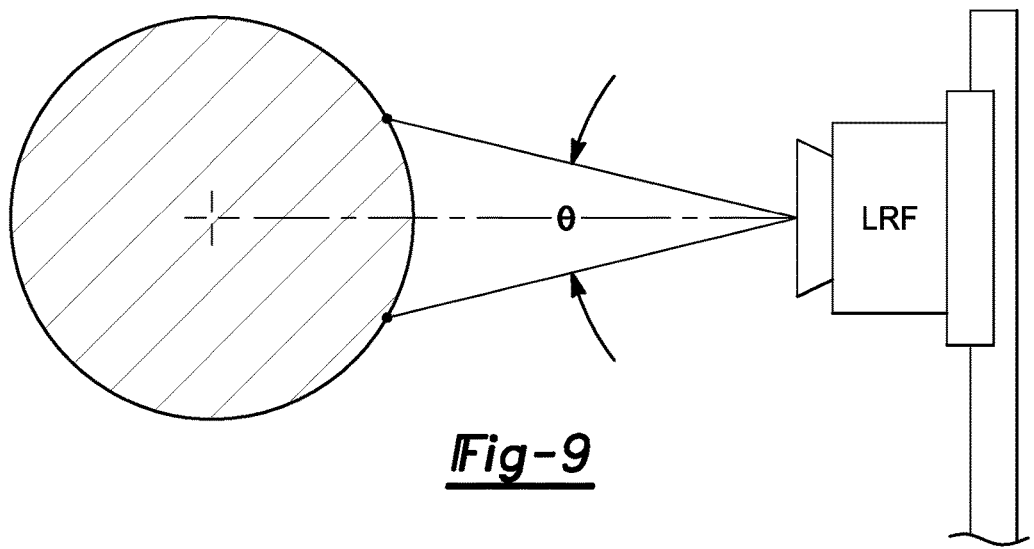
FIG. 9 is an alternative embodiment of the alignment apparatus having laser range finder (LRF) with a pivoting scanning motion.

In another embodiment, shown in FIG. 9, rather than vertically moving the LRF, the LRF is positioned in a fixed located at the approximate shaft center height. The beam of LRF is then pivoted over an angle θ about an axis generally parallel to the shaft to scan a plurality of Y-axis locations. Pivoting the LRF causes the laser beam emitted from the LRF to measure a spot on the rotatable shafts to move in the Y direction relative to the rotatable shafts. The shaft centerline is then determined as described above or as described in the following paragraph.

Figure 10:
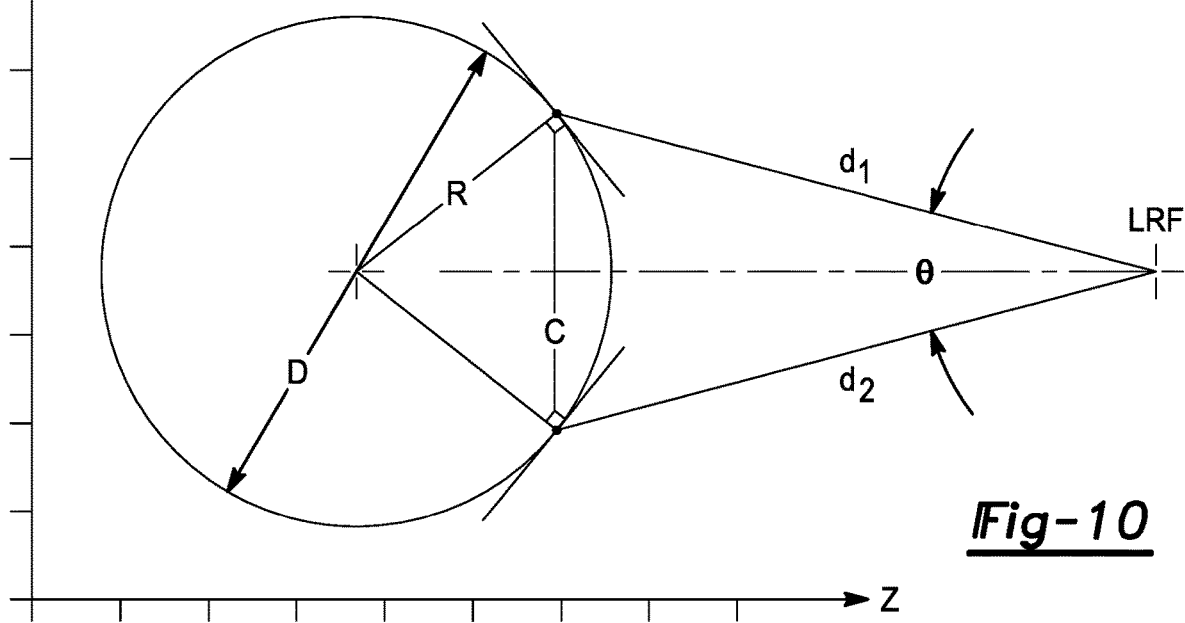
FIG. 10 illustrates the location of the centerline of a shaft of known diameter using two points on the shaft surface.

In another an alternative embodiment the diameter of the shaft is known in advance or is measured and input into the processor. When the shaft diameter is known it is only necessary to collect data for at least two Y-axis locations. The center location of a known diameter shaft can be determined with only two points as shown in FIG. 10. If the two measurement points are the same distance from the LRF dimension the distance between the points is the chord length C of a line extending through the shaft. A line through the LRF and the center of chord C goes through the center of the shaft as illustrated in FIG. 10. With the radius R known the shaft center can be located relative to the LRF position using simple algebra, the Pythagorean theorem, geometry, and the chord length equation. Alternatively, the two points can be used to locate the shaft center by fitting a known diameter arc to the two points. When the shaft diameter is known, much less data needs to be collected and the circle fitting calculations are greatly simplified.

In another embodiment of the apparatus 60, shown FIG. 11-14, the servo operated positioning device, is provided by a multi axis robotic arm 62 which provides another type of multi axis positioning device. The robotic arm 62 is affixed to a base 64 stationarily located relative to the axes of the rotating shafts to be aligned. The robotic arm 62 is made up of a lower member 66 attachable to the base 64 in one or more fixed locations. Preferably, atop the lower member 66 is a swivel plate 68 rotatable about a vertical $1^{st}$ axis by a $1^{st}$ servo motor. Pivotably attached to swivel plate 68 is a proximal end of lower arm 60. The proximal end of lower arm 70 is rotatable about a $2^{nd}$ axis, preferably parallel, to the swivel plate 68 by a $2^{nd}$ servo motor. The distal end of the $1^{st}$ arm is pivotable attached to the proximate end of an upper arm 72 and rotated about a horizontal $3^{rd}$ axis by a $3^{rd}$ servo motor. The distal end of the upper arm 72 is pivotably connected to a LRF and rotatable about a horizontal $4^{th}$ axis by a servo motor. Preferably the LRF is rotatable about a $5^{th}$ axis perpendicular to the $4^{th}$ axis by a $5^{th}$ servo motor. The $5^{th}$ axis enables the beam of the LRF to maintain a perpendicular position to the shaft after moving in an X-direction between two t spaced axial shaft locations without moving the robot lower member 66 along base 64.

The servo motors in the robotic arm enable the LRF to be precisely located in space and be circumferentially moved about the shaft. The laser beam formed by the LRF can be oriented perpendicular to the shaft. The use of a robotic arm enables the LRF to be located relatively close to the shaft, preferably within 40 mm, and more preferably with 20 mm, resulting in a high degree of accuracy. Of course, the multi axis robotic arm embodiment of the apparatus 60 can be used in the manner of the apparatus embodiments disclosed in FIGS. 1-10, where the distance from the LRF and the spot on the shift being measure is not held constant.

FIG. 11 is a plan view of robot arm 62 attached to base 64 which laterally positioned relative to motor M and pump P having a pair of generally coaxial shafts 12' and 14' interconnected by a coupling C. The robotic arm 62 is positioned on the base 64 outboard of the shaft 12' of pump P.

Preferably robot arm 62 can reach both the first and second X-axis location where measurements are taken. Alternatively, the robot arm 62 can be repositioned on the base 44 outboard using an X-axis servo. When propagating the movement of the LRF between X-axis locations care should be taken to avoid striking the LRF or the robot arm on the shafts, the coupling or any safety guards. Optionally a vision system having a camera or LIDAR sensor coupled to the controller to monitor the position of the LRF and the robot arm relative to the surroundings to avoid a strike.

Figure 11A:
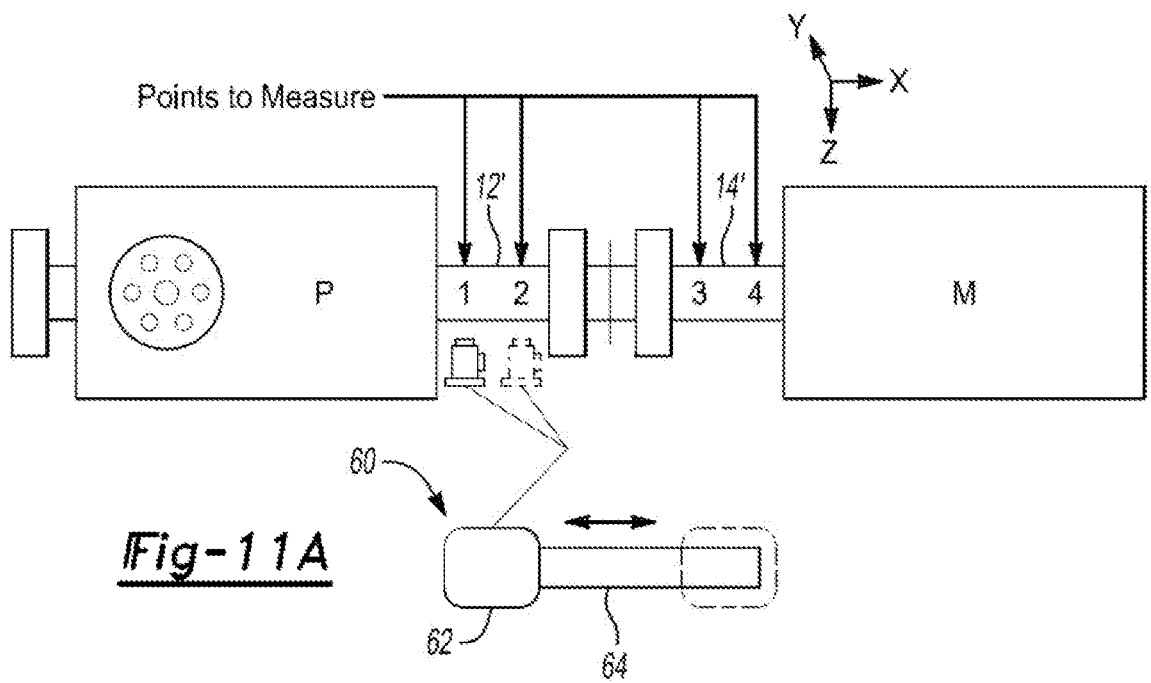
FIGS. 11A and 11B are a top views of an alternative alignment apparatus embodiment adjacent a motor driven pump.
Figure 11B:
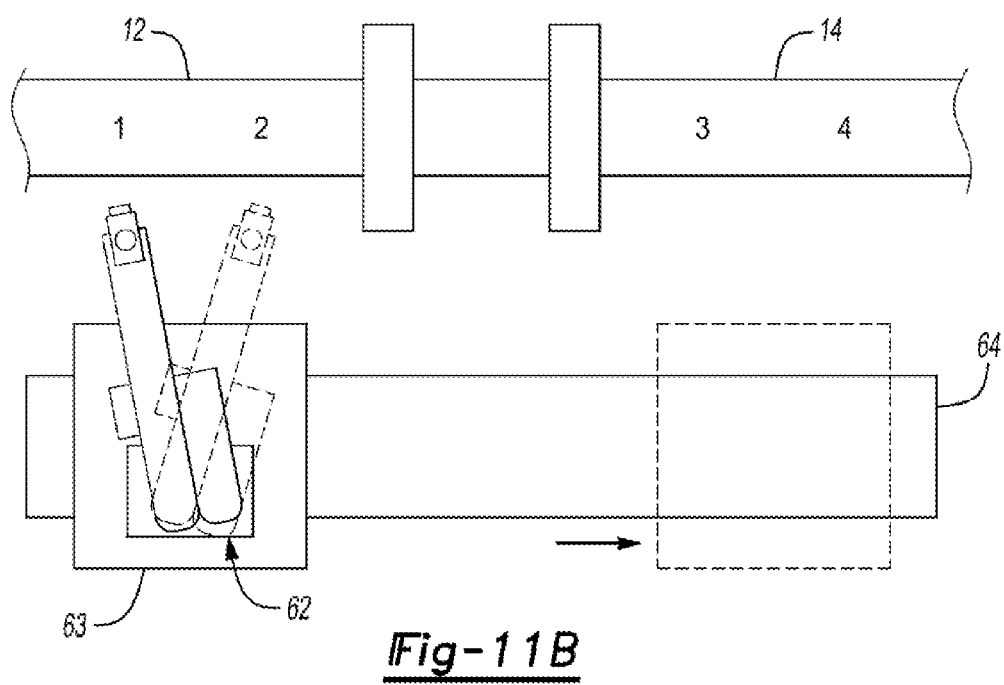

The robot arm 62 mounted on carriage 63 can be moved along the base 64, as shown in FIGS. 11A and 11B, to a position outboard of the motor M shaft shown in phantom outline. From this position robot arm 62 can reach both the third and fourth X-axis locations. Alternatively, the robotic arm 62 mounted on carriage 63 can be repositioned on the base 64 outboard using an X-axis servo. By moving the robotic arm 62 between measurements at the first and second and third and fourth X-axis locations the arm can remain generally perpendicular to the shaft minimizing the need to adjust the position of the LRF about the $5^{th}$ axis to be perpendicular to the shaft.

Figure 12:
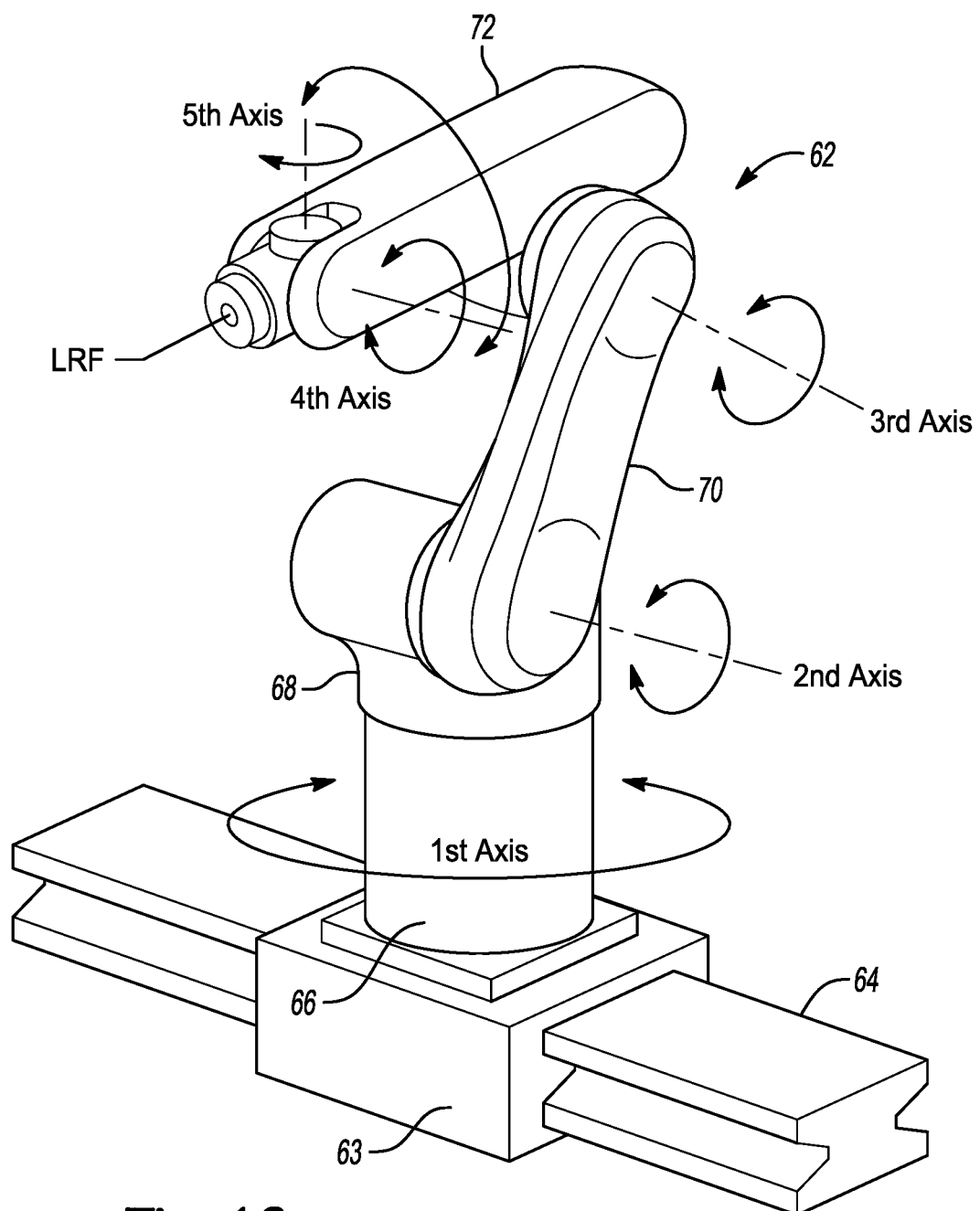
FIG. 12 is a perspective view of a multi axis robotic arm.

FIG. 12 is an example of a servo operated multi axis robotic arm 62 which is attachable to a base 64 for supporting a laser range finder (LRF) on the arm distal end (free end). The robotic arm distal end is pivotably attached to a laser range finder (LRF) to orient the LRF perpendicular to and space a distance from the rotating shaft to being measured. The LRF measures the location of a plurality of peripherally spaced spots on the shafts at two axial positions on each shaft.

FIG. 13 is a side cross-sectional elevation of multi axis robotic arm 62 with the LRF positioned in close proximity to the shaft to be measured. In order to achieve high accuracy, The LRF is preferably within 40 mm, and more preferably with 20 mm of the shaft. The LRF is moved about the periphery to a plurality of positions as illustrated. To locate the shaft center at least three spots on the shaft periphery must be measured. If the shaft diameter is known only two spot need to be measured. For accuracy purposes many more spots are measure to better fit a curve to the data. Preferably, at least 10 spots are measured over 45 degrees of the shaft circumference. More preferably, over 200 spots are measured over 90 degrees of the shaft circumference for best accuracy.

FIG. 14A illustrates a slight LRF misalignment from the ideal perpendicular alignment to the shaft. This will result in the section of oval shape, shown in exaggerated form. Once the LRF is aligned in a perpendicular manner as shown in FIG. 14B the cross section is circular. The $5^{th}$ axis servo motor at the arm distal end enables the beam of the LRF to be maintained perpendicular to the shaft after moving between two adjacent axial shaft locations without moving the robot arm 62 about a vertical axis relative to the base 64.

The method for aligning two rotating shafts which are coaxial coupled together using the multi axis robotic arm embodiment of the apparatus 60 has an initial step of providing a servo operated multi axis robotic arm attachable to a base affixed in spaced relation to axis of two axially coupled rotating shafts oriented along a Y-axis. The robotic arm has a distal end pivotably attached to a laser range finder (LRF) to orient the LRF a distance from the two rotating shafts to measures the location of a plurality of peripherally spaced spots on the shafts on two axial positions on each.

A controller is provided, having a processor and memory, communicating with the servo motors of the multi axis robotic arm, the LRF and a user interface. The controller positions the LRF at a first X-axis location on a first one of the rotating shafts. The controller communicating the servo motors of the multi axis robotic arm, and the X-axis servo to move the LRF peripherally about the shaft and while storing the LRF location and the measured distance to a plurality of peripherally spaced spots.

Next the controller positions the LRF at a second X-axis location on the first rotating shaft, causing the controller communicating the servo motors of the multi axis robotic arm, to move the LRF peripherally about the shaft and storing the LRF location and the measured distance to a plurality of peripherally spaced spots.

The controller moves the LRF to a third X-axis location on a second one of the rotating shafts, causing the controller communicating the servo motors of the multi axis robotic arm, to move the LRF peripherally about the shaft and storing the LRF location and the measured distance to a plurality of peripherally spaced spots.

The controller moves the LRF to a fourth X-axis location on the second rotating shaft, measuring causing the controller communicating the servo motors of the multi axis robotic arm, to move the LRF peripherally about the shaft and storing the LRF location and the measured distance to a plurality of peripherally spaced spots.

With the data collected the controller calculates, in the processor, the centerline of the two shafts at each of the four X-axis locations using stored LRF location and the measured distance to a plurality of peripherally spaced spots, using a best-fit circle algorithm to define two spaced apart axis location points for each shaft. The processor determines the adjustment of one of the two shafts needed to move the shafts in to coaxial alignment. The adjustment information needed to align the shafts is then output to the user via a user interface.

Figure 15:
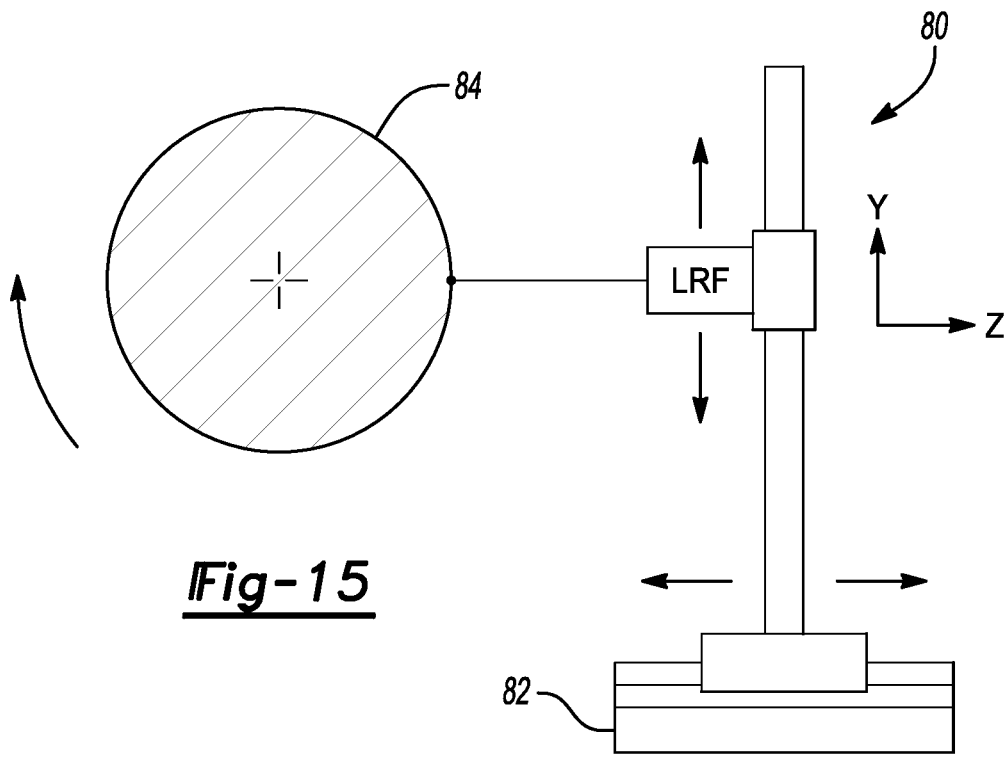
FIG. 15 is another alternative alignment apparatus embodiment adjacent a motor shaft.
Figure 16:
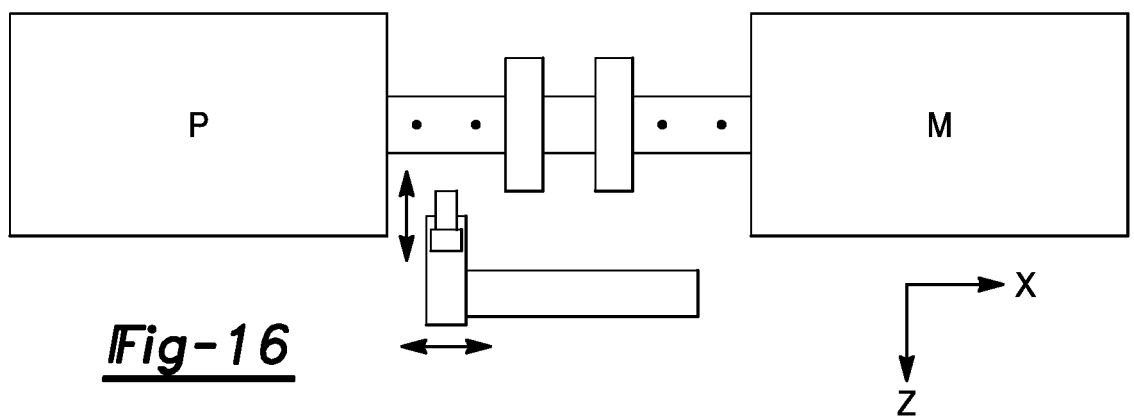
FIG. 16 is a top plan view of the alignment apparatus embodiment of FIG. 15.
Figure 17:
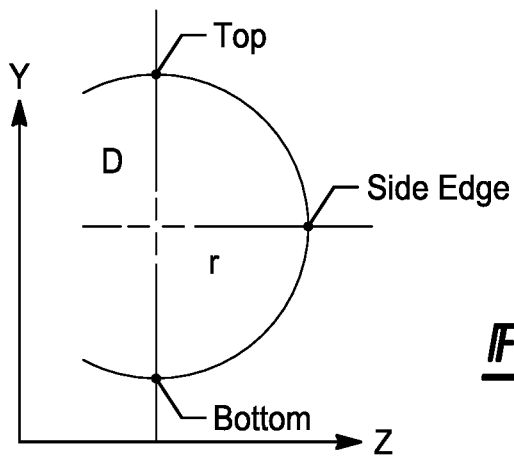
FIG. 17 is a X-Y plot of the average scan data at three positions on the shaft.

Another embodiment of the servo operated multi axis positioning device 80 is shown in FIG. 15-17. This simple device moves the LRF along the Y and Z axes via a servo motor relative to rotating shaft 84. Shaft center can be determined using curve fitting as previously described or, in the simplest form, the shaft diameter and centerline height is determined by locating the top and bottom edge of the shaft. The Z distance is determined by measuring the Z location of the shaft edge and subtracting the shaft radius. The device is preferably moved along a base between four positions along the X axis by a servo to measure two shaft centerlines on each of the shafts to be aligned.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for aligning two rotatable shafts which are coaxially coupled together, the apparatus comprising:
   a base which is positioned in spaced adjacent orientation to two rotatable shafts which are coaxially coupled together;
   a servo operated multi axis robotic arm attachable to a base and supporting a laser range finder (LRF), the robotic arm having a distal end pivotably attached to the laser range finder (LRF) to orient the LRF a distance from the two rotating shafts to measures the location of a plurality of peripherally spaced spots on the shafts at two axial positions on each shaft;
   a controller communicating with servo motors of the servo operated multi axis robotic arm and the LRF, the controller having a processor programmed to:
      position the LRF at a first axial location on a first one of the rotatable shafts, causing the controller communicating the servo motors of the multi axis robotic arm, to move the LRF peripherally about the shaft and storing the LRF location and the measured distance to a plurality of peripherally spaced spots;
      position the LRF at a second axial location on a first one of the rotatable shafts, causing the controller communicating the servo motors of the multi axis robotic arm, to move the LRF peripherally about the shaft and storing the LRF location and the measured distance to a plurality of peripherally spaced spots;
      position the LRF at a third axial location on a second one of the rotatable shafts, causing the controller communicating the servo motors of the multi axis robotic arm, to move the LRF peripherally about the shaft and storing the LRF location and the measured distance to a plurality of peripherally spaced spots;
      position the LRF at a fourth axial location on the second rotatable shafts, causing the controller communicating the servo motors of the multi axis robotic arm, to move the LRF peripherally about the shaft and storing the LRF location and the measured distance to a plurality of peripherally spaced spots; and
      calculating the centerline of the two shafts at each of the four X-axis locations using stored measurement and spot location data, locating an axis for each of the two shafts, and determining an adjustment for one of the two shafts to move the shafts in to coaxial alignment.

2. The apparatus of claim 1, wherein the controller is programmed to collect at least 10 data readings at each spot that data is collected and to generate an average distance value.

3. The apparatus of claim 1, wherein the controller is programmed to collect a least 200 data readings at each spot that data is collected.

4. The apparatus of claim 1, wherein the controller is programmed to calculate the center of the two shafts at each of the four X-axis locations by fitting a circular segment to the average collected data for each spot and using the diameter of a circle defined by the circular segment to determine the shaft center at each axial location.

5. The apparatus of claim 1, wherein the controller is programed to orient the LRF perpendicular to the shaft at each spot being measured.

6. The apparatus of claim 1, wherein the controller is programed to orient the LRF less than 80 mm from the shaft at the spots being measured.

7. The apparatus of claim 1, wherein servo operated multi axis robotic arm has at least four degrees of freedom controlled by four servo motors.

8. The apparatus of claim 1, wherein servo operated multi axis robotic arm has at least five degrees of freedom controlled by five servo motors.

9. The apparatus of claim 1, further comprising a carriage interposed between a robotic arm and the base wherein the robotic arm mounted on the carriage can slide along the base parallel to a Z-axis, driven by one of the servo motors, to move between at least two positions corresponding to the first and second shafts.

10. The apparatus of claim 9, wherein the robotic arm can move between at least four positions corresponding to the first, second, third and fourth axial locations on the two shafts.

11. A method for aligning two rotatable shafts which are coaxially coupled together, the method comprising:
providing a servo operated multi axis robotic arm attachable to a base affixed in spaced relation to axis of two axially coupled rotating shafts oriented along a X-axis, the robotic arm having a distal end pivotably attached to a laser range finder (LRF) to orient the LRF a distance from the two rotating shafts to measures the location of a plurality of peripherally spaced spots on the shafts at two spaced apart axial positions on each shaft;
providing a controller, having a processor and memory, communicating with the servo motors of the multi axis robotic arm, the LRF and a user interface;
positioning the LRF at a first X-axis location on a first one of the rotating shafts, causing the controller communicating the servo motors of the multi axis robotic arm, to move the LRF peripherally about the shaft and storing the LRF location and the measured distance to a plurality of peripherally spaced spots;
positioning the LRF at a second X-axis location on the first rotating shaft, axially spaced apart, from the first X-axis location, causing the controller communicating the servo motors of the multi axis robotic arm, to move the LRF peripherally about the shaft and storing the LRF location and the measured distance to a plurality of peripherally spaced spots;
positioning the LRF at a third X-axis location on a second one of the rotating shafts, causing the controller communicating the servo motors of the multi axis robotic arm, to move the LRF peripherally about the shaft and storing the LRF location and the measured distance to a plurality of peripherally spaced spots;
positioning the LRF at a fourth X-axis location on the second rotating shaft, axially spaced apart from the third X-axis location, causing the controller communicating the servo motors of the multi axis robotic arm, to move the LRF peripherally about the shaft and storing the LRF location and the measured distance to a plurality of peripherally spaced spots; and
calculating in the processor the centerline of the two shafts at each of the four X-axis locations using stored LRF location and the measured distance to a plurality of peripherally spaced spots, using a best-fit circle algorithm to define two spaced apart axis location points for each shaft and determining the adjustment of one of the two shafts needed to move the shafts in to coaxial alignment and outputting the adjustment information to the user via the user interface.

12. The method of claim 11 wherein the step of calculating the center of the two shafts at each of the four axial locations is done by fitting a circular segment to the collected data and using the diameter of a circle defined by the circular segment to determine the shaft center at each axial location.

13. The method of claim 11 wherein the two rotatable shafts are associated with a shaft driven rotary machine and a motor,
wherein the method further comprises operating the driven rotary machine and a motor for a period of time sufficient to reach a stable operating temperature before measuring distance to the shaft and storing the measurement and spot location data at each of the four axial positions while the driven rotary machine and motor are rotating.

14. The method of claim 11 wherein the controller collects at least 200 data readings at each spot that data is collected and generates and stores an average or median distance value at each spot.

15. The method of claim 11, wherein the provided positioning device further comprises proving an X-axis servo motor communicating with the controller, for positioning the multi axis robotic arm at an axial location on the base using an X-axis servo motor.

16. The method of claim 11, wherein the step of calculating the center of the two shafts at each of the four axial locations is done by fitting a circular segment to the collected data and using the diameter of a circle defined by the circular segment to determine the shaft center at each axial location.

17. The method of claim 11, wherein the two rotatable shafts are associated with a shaft driven rotary machine and a motor,
wherein the method further comprises operating the driven rotary machine and a motor for a period of time sufficient to reach a stable operating temperature before measuring distance to the shaft and storing the measurement and spot location data at each of the four axial positions while the driven rotary machine and motor are rotating.

18. An apparatus for aligning two rotatable shafts which are coaxially coupled together, the apparatus comprising:
a base which is positioned in a spaced adjacent orientation to two are coaxially coupled together;
a vertical guide supported on the base and movable relative thereto in a longitudinal direction parallel to the axis of the shafts and a transverse direction perpendicular to the shaft axis in plan view by a longitudinal servo and a transverse servo respectively;
a laser range finder (LRF) positioned to a distance from the two rotating shafts to measures the location of a plurality of vertically spaced spots on the shafts at two axial positions on each shaft, the LRF movable along the vertical guide by a vertical servo;
a controller communicating with servo motors of the longitudinal servo, the transverse servo and the vertical servo, the controller having a processor programmed to:
position the LRF at a first longitudinal location adjacent a first one of the rotatable shafts, causing the servo motors to move the LRF vertically relative the shaft and storing the LRF location and the measured distance to a plurality of vertically spaced spots;
position the LRF at a second longitudinal location adjacent a first one of the rotatable shafts, causing the servo motors to move the LRF vertically relative the shaft and storing the LRF location and the measured distance to a plurality of vertically spaced spots;
position the LRF at a third longitudinal location adjacent a second one of the rotatable shafts, causing the servo motors to move the LRF vertically relative the shaft and storing the LRF location and the measured distance to a plurality of vertically spaced spots;
position the LRF at a fourth longitudinal location adjacent a second one of the rotatable shafts, causing the servo motors to move the LRF vertically relative the shaft and storing the LRF location and the measured distance to a plurality of vertically spaced spots; and calculate the centerline of the two shafts at each of the four longitudinal locations using stored measurement and spot location data, locating an axis for each of the two shafts, and determining an adjustment for one of the two shafts to move the shafts in to coaxial alignment.

19. The apparatus of claim 18 wherein the controller is provided with a user interface enabling a user to input the known diameter of the shafts.

20. The apparatus of claim 19 wherein the processor is programmed to cause the vertical servo to move the LRF through a range sufficient to enable the processor to locate the vertical height center of the shaft and the distance between the shaft and the LRF and the shaft center thereby providing a location of the shaft centerline at each of the four longitudinal locations.

21. A method for aligning two rotatable shafts which are coaxially coupled together, the method comprising:
   providing a servo operated multi axis positioning device having at least 3 degrees of freedom attachable to a base affixed in spaced relation to axis of two axially coupled rotating shafts oriented along a X-axis, the robotic arm having a distal end pivotably attached to a laser range finder (LRF) to orient the LRF a distance from the two rotating shafts to measures the location of a plurality of peripherally spaced spots on the shafts at two spaced apart axial positions on each shaft;
   providing a controller, having a processor and memory, communicating with the servo motors of the multi axis positioning device, the LRF and a user interface;
   positioning the LRF at a first X-axis location on a first one of the rotating shafts, causing the controller communicating the servo motors of the multi axis positioning device, to move the LRF peripherally about the shaft and storing the LRF location and the measured distance to a plurality of peripherally spaced spots;
   positioning the LRF at a second X-axis location on the first rotating shaft, axially spaced apart, from the first X-axis location, causing the controller communicating the servo motors of the multi axis positioning device, to move the LRF peripherally about the shaft and storing the LRF location and the measured distance to a plurality of peripherally spaced spots;
   positioning the LRF at a third X-axis location on a second one of the rotating shafts, causing the controller communicating the servo motors of the multi axis positioning device, to move the LRF peripherally about the shaft and storing the LRF location and the measured distance to a plurality of peripherally spaced spots;
   positioning the LRF at a fourth X-axis location on the second rotating shaft, axially spaced apart from the third X-axis location, causing the controller communicating the servo motors of the multi axis positioning device, to move the LRF peripherally about the shaft and storing the LRF location and the measured distance to a plurality of peripherally spaced spots; and
   calculating in the processor the centerline of the two shafts at each of the four X-axis locations using stored LRF location and the measured distance to a plurality of peripherally spaced spots, using a best-fit circle algorithm to define two spaced apart axis location points for each shaft and determining the adjustment of one of the two shafts needed to move the shafts in to coaxial alignment and outputting the adjustment information to the user via the user interface.

* * * * *

UNITED STATES PATENT AND TRADEMARK OFFICE
CERTIFICATE OF CORRECTION

| | | |
|---|---|---|
| PATENT NO. | : 11,650,048 B2 | Page 1 of 1 |
| APPLICATION NO. | : 17/522303 | |
| DATED | : May 16, 2023 | |
| INVENTOR(S) | : Fred L. Strunk et al. | |

It is certified that error appears in the above-identified patent and that said Letters Patent is hereby corrected as shown below:

On the Title Page

Column 1, item (54), Title and in the Specification, Column 1, Line 2: delete "COAXTAILLY" and insert --COAXIALLY--

Signed and Sealed this
Eighth Day of August, 2023

*Katherine Kelly Vidal*

Katherine Kelly Vidal
*Director of the United States Patent and Trademark Office*